United States Patent
Toelke et al.

(10) Patent No.: US 11,928,807 B2
(45) Date of Patent: Mar. 12, 2024

(54) PARTITIONING OF PORES AND THROATS IN 2D AND 3D DIGITAL TOMOGRAPHIC REPRESENTATIONS

(71) Applicant: Halliburton Energy Services, Inc., Houston, TX (US)

(72) Inventors: Jonas Toelke, Houston, TX (US); Andre de Almeida Maximo, Houston, TX (US); Jacob Michael Proctor, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 199 days.

(21) Appl. No.: 17/339,207

(22) Filed: Jun. 4, 2021

(65) Prior Publication Data
US 2022/0230299 A1     Jul. 21, 2022

Related U.S. Application Data

(60) Provisional application No. 63/138,998, filed on Jan. 19, 2021.

(51) Int. Cl.
*G06K 9/00*    (2022.01)
*G06T 7/00*    (2017.01)
*G06T 7/11*    (2017.01)

(52) U.S. Cl.
CPC .............. *G06T 7/0004* (2013.01); *G06T 7/11* (2017.01); *G06T 2207/10072* (2013.01); *G06T 2207/20021* (2013.01); *G06T 2207/20036* (2013.01); *G06T 2207/30108* (2013.01); *G06T 2207/30181* (2013.01)

(58) Field of Classification Search
CPC .................... G06T 7/0004; G06T 7/11; G06T 2207/10072; G06T 2207/20021; G06T 2207/20036; G06T 2207/30108; G06T 2207/30181; G06T 2207/10081; G06T 2207/20152; E21B 47/13; E21B 47/005; E21B 47/01; E21B 43/25; E21B 47/10; E21B 33/13; E21B 43/26; E21B 17/028; E21B 17/0283; E21B 41/0085; G06V 10/764; G06V 10/30; G06V 10/40; G06V 10/82; G06V 10/44; G06V 20/64
See application file for complete search history.

(56) References Cited

U.S. PATENT DOCUMENTS 4,783,751 A * 11/1988 Ehrlich ................ G06V 20/695
                                                             345/581
10,691,846 B2 * 6/2020 Bryant ..................... G06F 30/20
(Continued)

OTHER PUBLICATIONS

Dong et al., "Pore-Network Extraction from Micro-Computerized-Tomography Images," *Physical Review E*, vol. 80, Issue 3, Sep. 14, 2009.

(Continued)

*Primary Examiner* — Alex Kok S Liew
(74) *Attorney, Agent, or Firm* — John W. Wustenberg; C. Tumey Law Group PLLC

(57) ABSTRACT

A system and method to partition pores and throats in 2D or 3D scanned tomographic representations. To achieve partitioning, the methods employ a series of techniques that include the Maximum Inscribed Ball technique, Connected Component Labelling technique, and the 3D Binary Morphology technique.

20 Claims, 6 Drawing Sheets

2D Image Examples (1 Volume Slice)

Input Binary Mask:
0 (Black) are Solid
1 (White) are Empty Space

Open Map Output:
Different Levels of Gray
Means Balls of Different
Sizes (White is Bigger)

Ball Binary Mask:
1 (White) are Balls of a
Certain Size and Above
0 (Black) are Either Smaller
Balls or Solid Labelling Output:
Different Levels of Gray
Means Different
Connected Regions □ 1 Pixel in an Image = 1 Picture Element
▣ 1 Voxel in a Volume = 1 Volume Element Open Map (OM)= Maximal Inscribed Spheres/Balls
(MIS/MIB)= Covering Radius Transform (CRT)
Labelling= Connected Component Labelling

(56) References Cited

U.S. PATENT DOCUMENTS

| | | | |
|---|---|---|---|
| 2008/0002873 A1* | 1/2008 | Reeves | G06T 5/002 |
| | | | 382/133 |
| 2015/0043787 A1 | 2/2015 | Fredrich et al. | |
| 2020/0309667 A1 | 10/2020 | Nie et al. | |

OTHER PUBLICATIONS

Gerke et al., "Improving Watershed-Based Pore-Network Extraction Method Using Maximum Inscribed Ball Pore-Body Positioning," *Advances in Water Resources*, vol. 140, Jun. 2020.

Gostick, "Versatile and Efficient Pore Network Extraction Method Using Marker-Based Watershed Segmentation," *Physical Review E*, vol. 96, Issue 2, Aug. 16, 2017.

Search Report and Written Opinion issued for International Patent Application No. PCT/US2021/035897, dated Oct. 14, 2021, 10 pages.

Teo et al., "Modeling, Description, And Characterization of Fractal Pore Via Mathematical Morphology," Discrete Dynamics in Nature and Society, vol. 2, 006, pp. 1-24, Sep. 28, 2006 [retrieved on Sep. 2, 2021]. Retrieved from <URL: https://downloads.hindawi.com/journals/ddns/2006/089280.pdf>.

Willson et al., "Quantification of Grain, Pore, and Fluid Microstructure of Unsaturated Sand from X-Ray Computed Tomography Images," Geotechnical Testing Journal, vol. 35, No. 6, pp. 1-13, Oct. 3, 2012 [retrieved on Sep. 2, 2021]. Retrieved from <URL: https://www.pc-progress.com/Images/Personal/NL.u/Publications/NLJ67201204.pdf>.

\* cited by examiner

PARTITIONING OF PORES AND THROATS IN 2D AND 3D DIGITAL TOMOGRAPHIC REPRESENTATIONS

PRIORITY

The present application is a Non-Provisional patent application of U.S. Provisional patent application No. 63/138,998, filed on Jan. 19, 2021, the benefit of which is claimed and the disclosure of which is incorporated herein by reference in its entirety.

FIELD OF THE DISCLOSURE

The present disclosure relates generally to computerized imaging, modeling and simulation, and, more specifically, to a method and system to partition pores and throats of a digital tomographic representation used to plan, perform or analyze a hydrocarbon wellbore operation.

BACKGROUND

In oil and gas exploration, network models representing void spaces of a rock by a lattice of pores connected by throats are used to predict permeability and other production-related characteristics. Computerized tomography scanning provides a three-dimensional ("3D") representation (also referred to as a 3D volume) of the pore space. Pore networks must then be extracted from the representations and used to generate pore network modeling simulations which are useful for many reasons including, for example, predicting transport properties to simulating well performance. However, the tomographic representations cannot be directly input into network models. The partition of pores appearing in empty spaces inside the rock volume is an important task in digital rock analysis. The volume in this context is a set of computer-tomographic representations. Partitioning consists of separating one pore from another, especially when those pores reside in the same connected empty space, and separating pore-intersection regions, called throats.

In digital rock analysis, the location of pores and their connectivity via throats form the basis of many computations ranging from rock properties characterization to fluid simulations. Industry standard tools normally use a simple watershed method known to separate different objects, such as pores, in a two-dimensional image. However, such standard tools do not produce accurate results when separating the same objects in a three-dimensional volume because those standard tools cannot interpret intersecting regions, such as throats.

DESCRIPTION OF ILLUSTRATIVE EMBODIMENTS

Illustrative embodiments and related methods of the present disclosure are described below as they might be employed in a system that partitions pores and throats of a computerized/digital tomographic representation. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As will be described below, illustrative methods and embodiments of the present disclosure perform pore and throat partitioning on a 3D digital rock scanned using computed tomography. The various illustrative methods employ a series of techniques designed to process 2D images or 3D volumes and partition pores and throats. These techniques include the Maximum Inscribed Ball technique (also referred to as the "Open Map" or "3D Open Map" technique), Connected Component Labelling technique, and the 3D Binary Morphology technique. By the appropriate and orchestrated use of these techniques of described herein, pores and throats identified and partitioned in a novel way, opening the path to high-quality computing services based on the proposed methods.

In a generalized embodiment and method of the present disclosure, the partitioning system obtains a digital tomographic representation of a rock that includes pores and throats. The pores are empty spaces inside the rock and the throats are connections between two or more pores. The system then begins partitioning the pores and throats with the tomographic representation by characterizing the pores using a Maximum Inscribed Ball technique. After the characterization, the sizes of the pores are grown, and a Connected Component Labelling technique is used to label the tomographic representation. After growing the pores, the pores and throats are partitioned using a Digital Binary Morphology technique, resulting in the partitioned tomographic representation. The partitioned tomographic representation is then output in any desired way.

Figure 1:
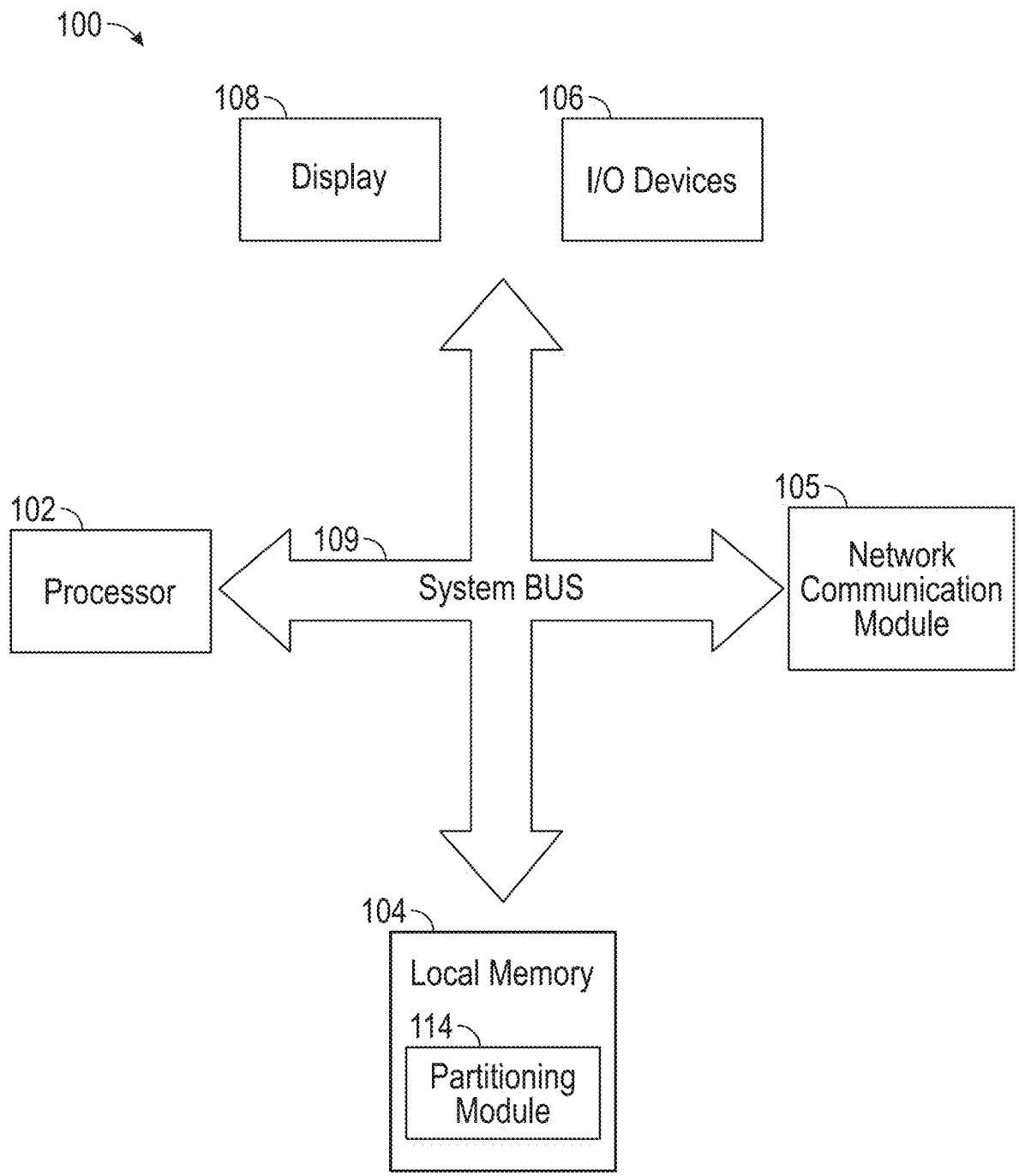
FIG. 1 shows a block diagram of a tomographic representation partitioning system 100 according to certain illustrative embodiments of the present disclosure.

FIG. 1 shows a block diagram of tomographic representation partitioning system 100 according to certain illustrative embodiments of the present disclosure. Partitioning system 100 includes at least one processor 102, a non-transitory, computer-readable storage 104 (e.g., local memory), transceiver/network communication module 105, optional I/O devices 106, and an optional display 108 (e.g., user interface), all interconnected via a system bus 109. Software instructions executable by the processor 102 for implementing software instructions stored within partitioning module 114 in accordance with the illustrative embodiments and methods described herein, may be stored in storage 104 or some other computer-readable medium. Although not explicitly shown in FIG. 1, it will be recognized that partitioning system 100 may be connected to one or more public and/or private networks via one or more appropriate network connections via network communication module 105. It will also be recognized that the software instructions comprising partitioning module 114 may also be loaded into storage 104 from appropriate storage media (e.g. a portable memory/hard drive, a CD-ROM, or the like) via wired or wireless methods.

Moreover, those ordinarily skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Still referring to the illustrative embodiment of FIG. 1, partitioning module 114 includes software that enables users to perform interactive visualization and computation on 2D and 3D data sets. Illustrative platforms may include Avizo™, MorphoLibJ™ or other suitable platforms. Those ordinarily skilled in the art having the benefit of this disclosure realize a variety of other tomographic imaging platforms or set of software applications may also be utilized with the present disclosure.

Partitioning module 114 may also include processing circuitry to enable robust data retrieval and integration of historical and real-time reservoir related data that spans across all aspects of the well planning, construction and completion processes such as, for example, drilling, cementing, wireline logging, well testing and stimulation. Moreover, such data may include, for example, logging data, well trajectories, petrophysical rock property data, mechanical rock property data, surface data, fault data, data from surrounding wells, data inferred from geostatistics, etc. The database (not shown) which stores this information may reside within local memory 104 or at a remote location. An illustrative database platform is, for example, the INSITE® software suite, commercially offered through Halliburton Energy Services Inc. of Houston Texas Those ordinarily skilled in the art having the benefit of this disclosure realize there are a variety of software platforms and associated systems to retrieve, store and integrate the well related data, as described herein.

In addition, partitioning module 114 may also include multi-domain workflow automation capabilities that may connect any variety of desired technical applications. As such, the output from one application, or module, may become the input for another, thus providing the capability to analyze how various rock characteristics impact the well placement and/or design. Those ordinarily skilled in the art having the benefit of this disclosure realize there are a variety of workflow platforms which may be utilized for this purpose.

Figure 2:
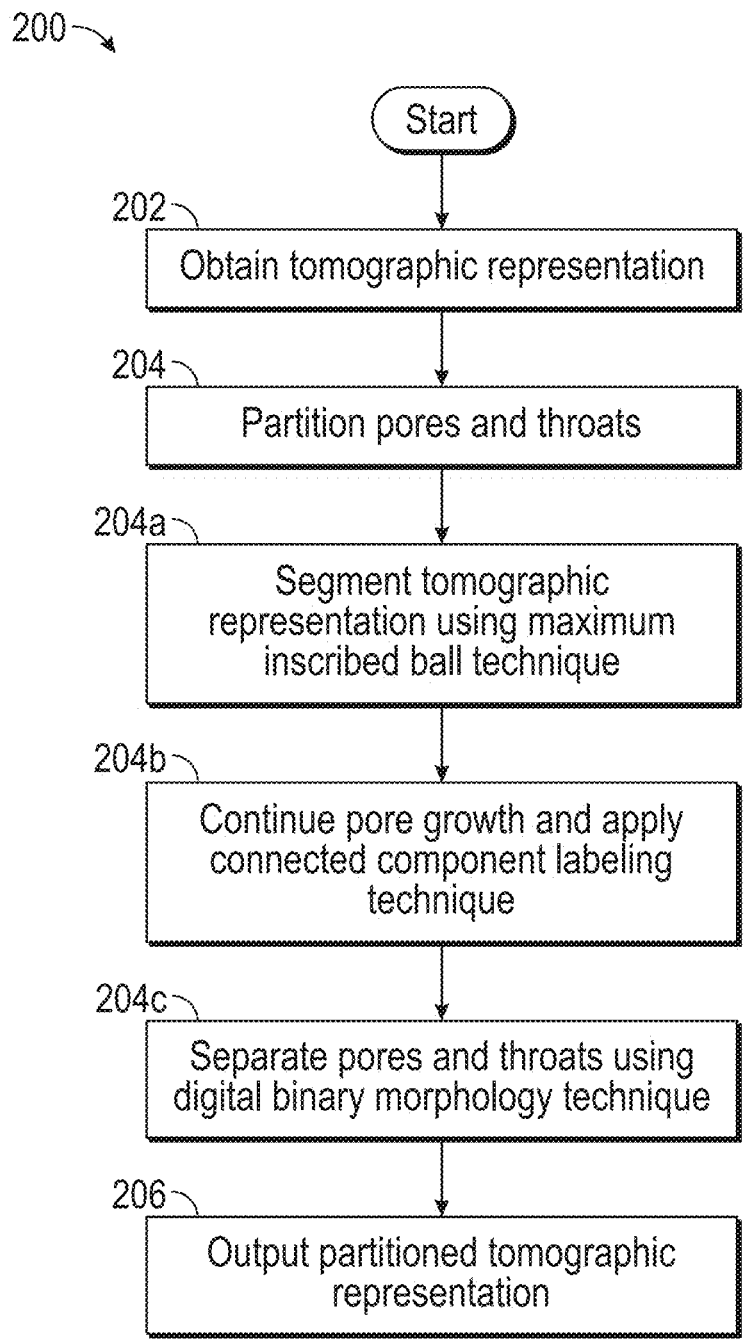
FIG. 2 is a flow chart of a method for generating a partitioned digital tomographic representation, according to certain illustrative methods of the present disclosure.

FIG. 2 is a flow chart of a method 200 for generating a partitioned computerized tomographic representation, according to certain illustrative methods of the present disclosure. At block 202, partitioning system 100 obtains a digital tomographic representation of a rock that includes pores and throats. The tomographic representation may be a 2D image or a 3D volume. The pores are empty spaces inside the rock in which hydrocarbons, gases or other fluids are located. The throats are connections between pores within the rock which allow the fluids to flow through the rock. The tomographic representation may be obtained using any variety of tomographic imagining methods such as, for example, computer-tomographic ("CT") and micro-CT scanner methods.

At block 204, partitioning system 100 partitions the pores and throats within the tomographic representation. To achieve this in one illustrative method, partitioning system 100 first characterizes the pores using a Maximum Inscribed Ball technique at block 204*a*. An illustrative Maximum Inscribed Ball technique is the one described in "*Improving watershed-based pore-network extraction method using maximum inscribed ball pore-body positioning*," Kirill M. Gerke et al., Advances in Water Resources, Vol. 140, June 2020, 103576 (https://www.sciencedirect.com/science/article/abs/pii/S0309170819300739), the relevant portions of which are herein incorporated by reference in their entirety. The Maximum Inscribed Ball technique is known by a variety of other names such as, for example, Maximum Inscribed Sphere, Open Map or 3D Open Map.

To further describe the Maximum Inscribed Ball technique of block 204*a*, partitioning system 100 segments the 3D volume (or 2D image) into solid voxels (representing solid areas of the rock) and empty voxels (representing hollow areas of the rock—i.e., pores). The scanned computerized rock volume is made up of 3D volume data sets comprising "voxels" or volume elements, whereby each voxel may be identified by the x, y, z coordinates of one of its eight corners or its center. Each voxel also represents a numeric data value (attribute) associated with some measured or calculated physical property at a particular location. Partitioning system 100 then computes the open map of the segmented volume by iteratively assigning each empty voxel a radius value for the maximum ball inscribed in the empty space surrounding that empty voxel. Partitioning system 100 then computes a binary mask of the 3D volume by assigning a 1 to the current ball radius (or larger) and assigning a 0 to all other radii of the empty voxels, which ultimately characterizes the pores. To be more specific, partitioning system 100 iteratively ranges from the maximum to minimum inscribed sphere or ball size, on each step growing the region (as the binary mask is computed on the current sphere size and larger). That is each iterative step grows the regions as it includes every voxel from previous iteration plus the current ball size. A voxel is labelled in a region if it is neighbor to another voxel of this region. "Neighborhood" depends on the chosen connectivity, which is an input parameter of the system.

At block 204*b*, after the characterization of the pores, partitioning system 100 continues growing the pore sizes and applies a Connected Component Labeling technique. Connected Component Labeling is an algorithmic application of graph theory, where subsets of connected components are uniquely labeled based on a given heuristic. Connected Component Labeling can be defined as the creation of a labeled image (digital representation) in which the positions associated with the same connected component of a binary input representation have a unique label. An illustrative Connected Component Labeling technique can be the one described in G. A. Baxes, *Digital image processing: principles and applications*, Wiley, New York, 1994, the relevant portions of which are herein incorporated by reference in their entirety.

To further describe the growth and labeling of block 204*b*, portioning system 100 identifies regions comprised of connected empty voxels using the binary mask (begins in block 204*a*). The regions are comprised of empty voxels of the same pore. Those regions are then each given a label (e.g., #1, 2, 3 . . . ) using the Connected Component Labeling technique. Voxels in the same pore have the same pore label. The Connected Component Labeling algorithm is responsible to define different pore regions which will be the connected-component regions. New regions are assigned new pore labels. If the region already existed before (in a smaller size) and it contains just one pore label (assigned before), the pore region continues to grow. If the region contains two or more pore labels, however, the region does not grow as it encompasses more than one pore. At the last iteration, i.e., radius=1, the result is a pore partition which leaves out the voxels that share intersections with different pores.

At block 204*c*, after the pores have been grown and labeling has concluded, partitioning system 100 then separates the throats and pores using a Digital Binary Morphology technique, which ultimately results in the partitioned tomographic representations. Digital Binary Morphology is a theory and technique for the analysis and processing of geometrical structures, based on set theory, lattice theory, topology, and random functions. Digital Binary Morphology is described in more detail in *Image Processing and Mathematical Morphology Fundamentals and Applications*, by Frank Y. Shih, CRC Press; 1st edition (Mar. 23, 2009), the relevant portions of which are herein incorporated by reference in their entirety.

Figure 3:
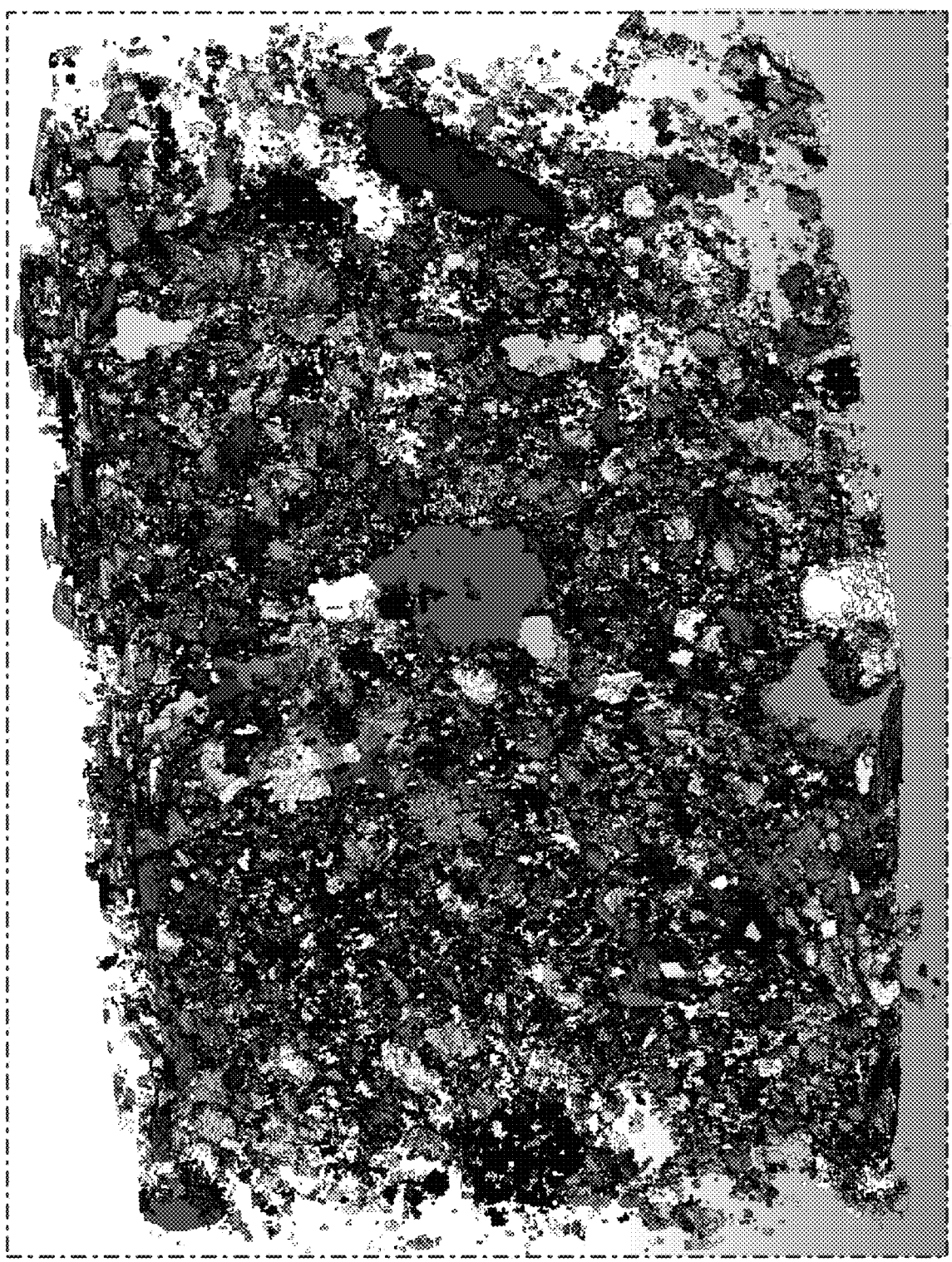
FIG. 3 is a graphical illustration of a partitioned tomographic representation showing pores and throats, according to certain illustrative embodiments of the present disclosure.
Figure 4:
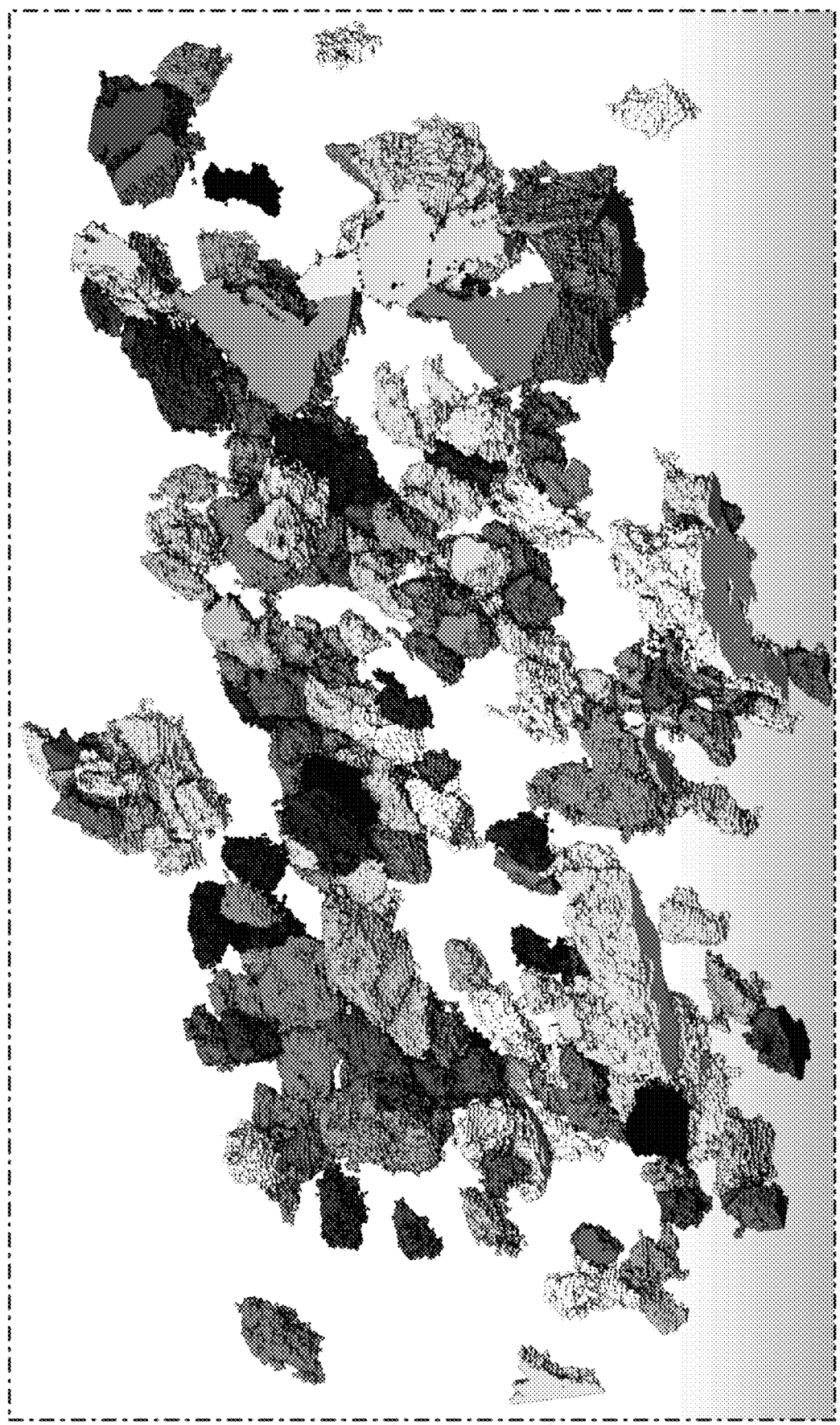
FIG. 4 is a graphical illustration of a partitioned tomographic representation showing only large pores, according to certain illustrative embodiments of the present disclosure.

To further describe this illustrative use of Binary Morphology in block 204*c*, partitioning system 100 performs an iterative one-by-one neighbor voxel dilation that grows each pore by any single, remaining, unlabeled and empty voxel that neighbors the last pore. A pore label or throat label is then assigned to each neighboring voxel, thereby separating the pores and throats. Here, partitioning system 100 performs a one-neighbor voxel dilation iteratively. In other words, each iteration grows (by one voxel) the remaining unlabeled empty voxels by assigning a neighbor label to it if it contains a single pore as neighbor, or assigning a throat label to it if it contains two or more pore labels as neighbors. Please note, however, in alternative embodiments, the voxel dilation may be performed one d voxels (d>=1) at a time. After all iterations are completed, all voxels are labelled, and the N pores are separated, where each voxel has a value of either one pore label, a number between 1 and N, or the throat label, arbitrarily labelled N+1. The value 0 remains assigned to the solid voxels. An example result of the partitioning methods described herein can be seen in FIG. 3, a graphical illustration showing all illustrative partitioned pores and FIG. 4, another graphical illustration, showing only large partitioned pores for illustration.

Figure 5:
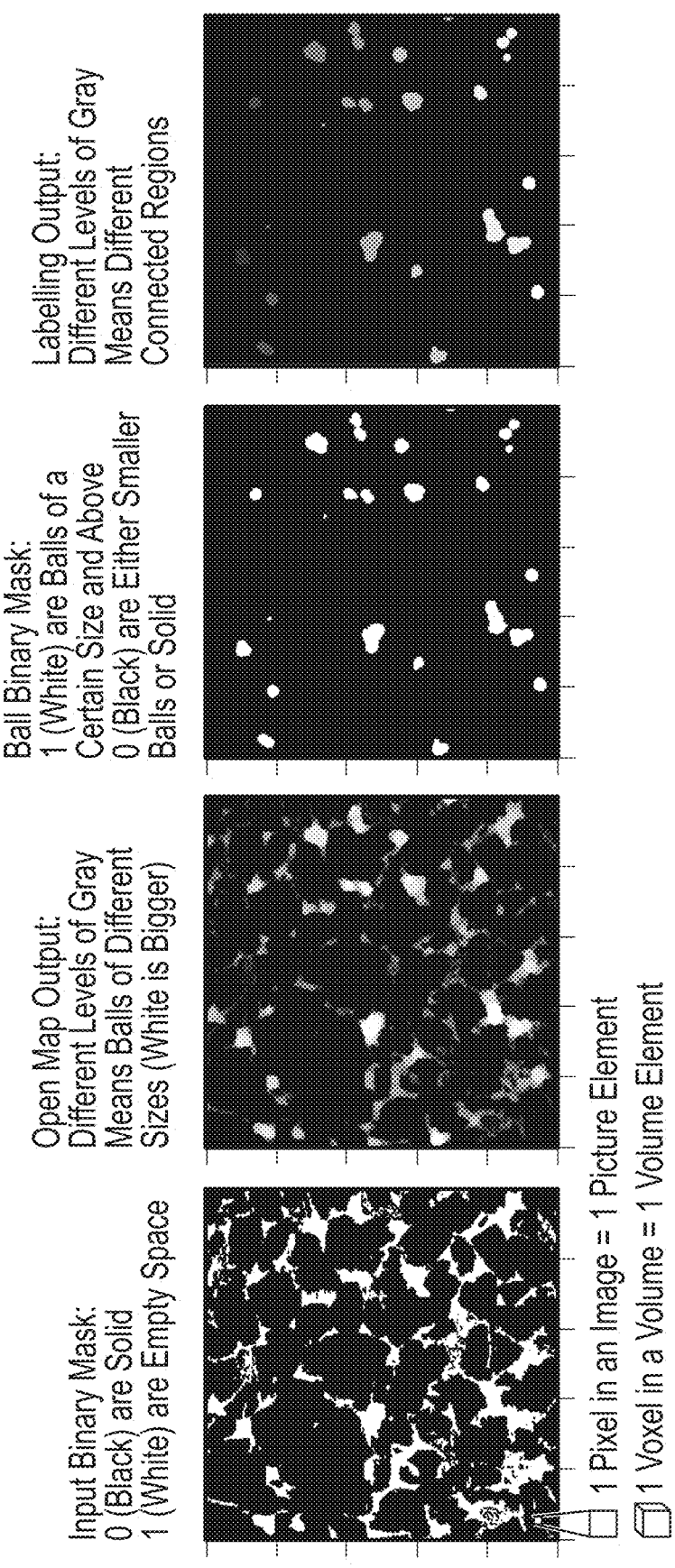
FIG. 5 is a graphical illustration showing pores in a single volume slice of a 2D partitioned image, according to certain illustrative embodiments of the present disclosure.

FIG. 5 is a graphical illustration showing pores in a single volume slice of a 2D partitioned image, according to certain illustrative embodiments of the present disclosure. In the left-most image, the input binary mask includes solid (black) spaces and empty (white) spaces. The next adjacent image shows an open map output comprising different ball sizes identified by different levels of gray, with white indicating the largest balls. The next adjacent image is the final binary mask that includes balls of x size and above (indicated by white color) and all balls smaller than x size or solid (indicated by black color). Note the covering radius transform is equal to the open map. The right-most image shows the connected labeling output which includes different connected regions identified by different levels of gray.

Thereafter, at block 206, partitioning system 100 outputs the partitioned tomographic representation in a variety of ways. The pore partitioned representation (also referred to as "pore segmentation") may be output via display 108, printed form, as a digital output that is input into another algorithm for further analysis and processing, etc.

In an alternative method of the present disclosure, the pore partitioning of the scanned tomography representation may be performed using only a Watershed technique such as, for example, described in Luc Vincent and Pierre Soille, "*Watersheds in digital spaces: an efficient algorithm based on immersion simulations*," IEEE Transactions on Pattern Analysis and Machine Intelligence, Vol. 13, Num. 6 (1991), pages 583-598. This illustrative watershed method may be applied instead of method 200 to compute a pore partitioning in a 3D volume. In this method, partitioning system 100 locates the highest elevated regions in the empty space of the rock volume, that is the voxels that are furthest away from the closets solid voxel and labelling those voxels as different pores. Then partitioning system 100 begins "shedding water" by assigning the same pore label to its closest neighbors iteratively until it touches a different pore labelled voxel. This technique is mainly used in pixels of a 2D image, and it is based on a 2D binary morphology dilation operator, but the method can also be used in voxels of a 3D volume (employing dilation using 3D binary morphology). This method is similar to block 204*c*, but is different in that it begins with isolated pore partitioning and without handling throats.

The illustrative embodiments and methods described herein provide a number of advantages. By applying alternating Open Map and Labelling techniques iteratively to have an initial estimation of pore partitions and then applying iteratively dilation to continue growing the pores and labeling throats as intersecting regions, the illustrative methods described herein achieve a final partitioning accurate to the geological sciences foundations in those pores and throats concepts. Therefore, the methods described herein improve the decision making process and analyses in any industry benefiting from the digital rock analysis over conventional methods that do not consider such geological foundations, such as the Watershed technique.

The partitioned tomographic representations may be utilized in a variety of applications, such as to perform property characterization of the rock (e.g., permeability, wettability, etc.), in a reservoir fluid simulation, to design, drill or produce from a downhole well or to otherwise plan, perform, or analyze a wellbore operation.

Figure 6:
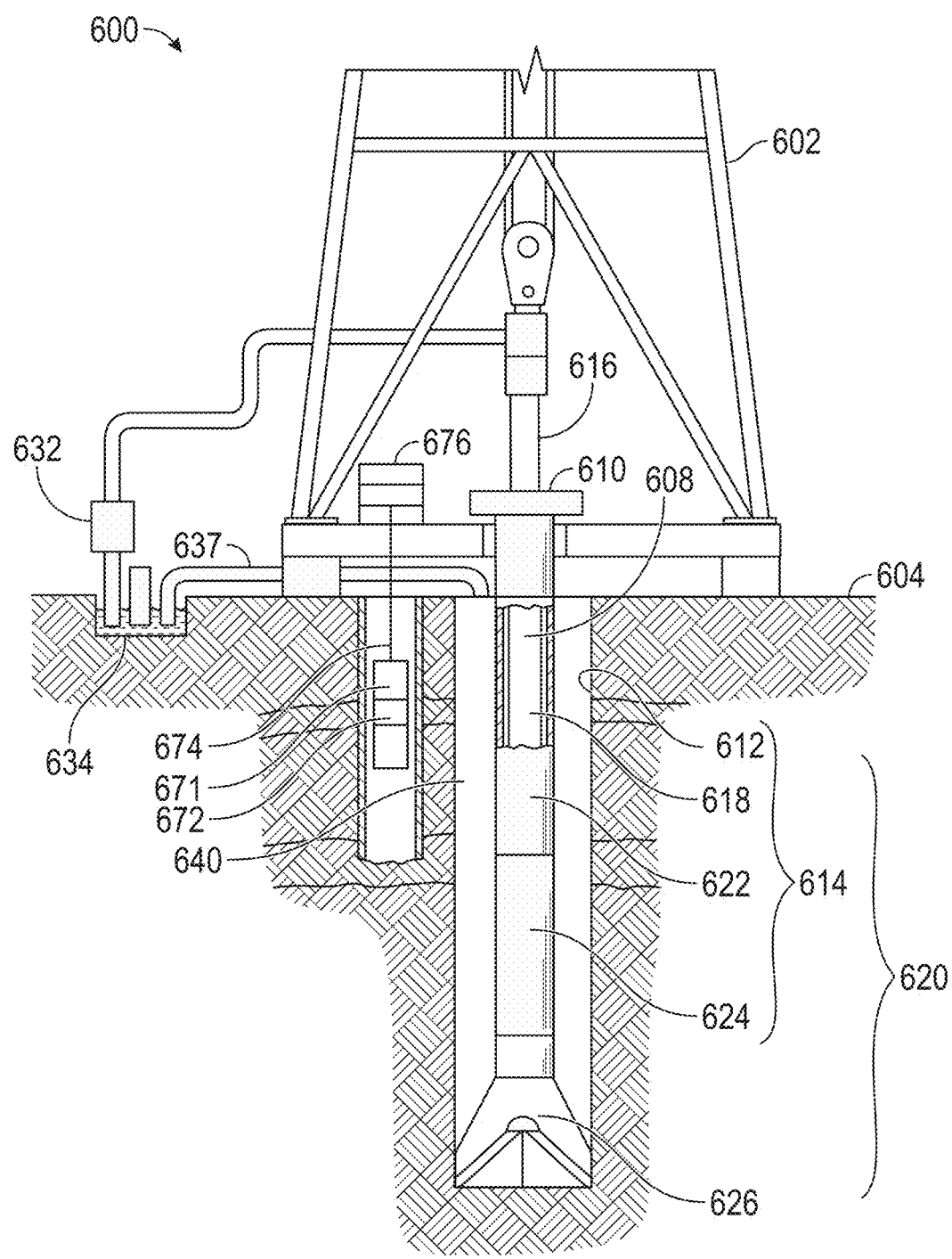
FIG. 6 illustrates a downhole system 600 which can be used in conjunction with the illustrative methods disclosed herein.

FIG. 6 illustrates a downhole system 600 which can be used in conjunction with the illustrative methods disclosed herein. It should be noted the system 600 can also include a system for pumping or other operations. System 600 includes a drilling rig 602 located at a surface 604 of a wellbore. Drilling rig 602 provides support for a downhole apparatus, including a drill string 608. Drill string 608 penetrates a rotary table 610 for drilling a borehole/wellbore 612 through subsurface formations 614. Drill string 608 includes a Kelly 616 (in the upper portion), a drill pipe 618 and a bottomhole assembly 620 (located at the lower portion of drill pipe 618). In certain illustrative embodiments, bottomhole assembly 620 may include drill collars 622, a downhole tool 624 and a drill bit 626. Downhole tool 624 may be any of a number of different types of tools including, for example, measurement-while-drilling ("MWD") tools or logging-while-drilling ("LWD") tools.

During drilling operations, drill string 608 (including Kelly 616, drill pipe 618 and bottom hole assembly 620) may be rotated by rotary table 610. In addition or alternative to such rotation, bottom hole assembly 620 may also be rotated by a motor that is downhole. Drill collars 622 may be used to add weight to drill bit 626. Drill collars 622 also optionally stiffen bottom hole assembly 620 allowing it to transfer the weight to drill bit 626. The weight provided by drill collars 622 also assists drill bit 626 in the penetration of surface 604 and subsurface formations 614.

During drilling operations, a mud pump 632 optionally pumps drilling fluid (e.g., drilling mud), from a mud pit 634 through a hose 636, into drill pipe 618, and down to drill bit 626. The drilling fluid can flow out from drill bit 626 and return back to the surface through an annular area 640 between drill pipe 618 and the sides of borehole 612. The drilling fluid may then be returned to the mud pit 634, for example via pipe 637, and the fluid is filtered. The drilling fluid cools drill bit 626, as well as provides for lubrication of drill bit 626 during the drilling operation. Additionally, the drilling fluid removes the cuttings of subsurface formations 614 created by drill bit 626.

Still referring to FIG. 6, downhole tool 624 may also include any number of sensors which monitor different downhole parameters and generate data that is stored within one or more different storage mediums within the downhole tool 624. Alternatively, however, the data may be transmitted to a remote location (e.g., surface) and processed accordingly. Such parameters/data may include any of the data described herein, such as logging data related to the various characteristics of the subsurface formations (such as resistivity, radiation, density, porosity, etc.) and/or the characteristics of the borehole (e.g., size, shape, etc.), etc.

FIG. 6 also illustrates an alternative embodiment in which a wireline system is deployed. In such an embodiment, the wireline system may include a downhole tool body 671 coupled to a base 676 by a logging cable 674. Logging cable 674 may include, but is not limited to, a wireline (multiple power and communication lines), a mono-cable (a single conductor), and a slick-line (no conductors for power or communications). Base 676 is positioned above ground and optionally includes support devices, communication devices, and computing devices. Tool body 671 may house any necessary measurement devices 672. In an embodiment, a power source (not shown) is positioned in tool body 671 to provide power to the tool 671. In operation, the wireline system is typically sent downhole after the completion of a portion of the drilling.

More specifically, in certain methods, drill string 508 creates borehole 612, then drill string 608 is removed, and the wireline system is inserted into borehole 612, as will be understood by those ordinarily skilled in the art having the benefit of this disclosure. Note that only one borehole is shown for simplicity in order to show the tools deployed in drilling and wireline applications. In certain applications, such as ranging, multiple boreholes would be drilled as understood in the art.

Thus, the present disclosure is applicable in a variety of applications. For example, a primary and often unique application of reservoir simulation is in estimation of recoverable reserves in an oil and gas asset. The ability to create a reservoir simulation makes it possible to more accurately and in a timely manner predict ultimate recovery from the reservoir, both conventional and unconventional, whether of typical or very large size. Thereafter, the reservoir simulation may be utilized to plan the exploitation of an oil and gas asset.

Further, the illustrative methods and embodiments described herein may be applied in any industry which benefits from the digital rock analysis described herein.

Embodiments and methods described herein further relate to any one or more of the following paragraphs:

1. A computer-implemented method to generate a partitioned digital tomographic representation, the method comprising: obtaining a digital tomographic representation of a rock comprising pores and throats, wherein the pores are empty spaces inside the rock and the throats are connections between the pores; partitioning the pores and throats within the tomographic representation by: characterizing the pores using a Maximum Inscribed Ball technique; after the characterization, growing sizes of the pores and applying a Connected Component Labelling technique; and after growing the pores, separating the pores and throats using a Digital Binary Morphology technique, thereby generating the partitioned tomographic representation; and outputting the partitioned tomographic representation.

2. The computer-implemented method as defined in paragraph 1, wherein characterizing the pores using the Maximum Inscribed Ball technique comprises: segmenting the tomographic representation into solid voxels and empty voxels, the empty voxels representing the pores; assigning each empty voxel a radius value for the ball inscribed in empty space surrounding the empty voxel; iteratively computing a binary mask of the representation by assigning a 1 or 0 to each ball radius of the empty voxels, thereby characterizing the pores.

3. The computer-implemented method as defined in paragraphs 1 or 2, wherein growing sizes of the pores and applying the Connected Component Labelling technique comprises: growing the pores by identifying regions of connected empty voxels using the binary mask, the regions being voxels of the same pore; and assigning a different label to each region using Connected Component Labelling.

4. The computer-implemented method as defined in any of paragraphs 1-3, wherein separating the pores and throats using the Digital Binary Morphology technique comprises: iteratively performing a one-neighbor voxel dilation that grows each pore by any remaining, single, unlabeled empty voxel which neighbors the pore; and assigning a pore label or throat label to each neighboring voxel, thereby separating the pores and throats.

5. The computer-implemented method as defined in any of paragraphs 1-4, wherein the partitioned tomographic representation is used to perform rock property characterization.

6. The computer-implemented method as defined in any of paragraphs 1-5, wherein a fluid simulation is performed using the partitioned tomographic representation.

7. The computer-implemented method as defined in any of paragraphs 1-6, wherein a downhole well is drilled or produced using the partitioned tomographic representation.

8. The computer-implemented method as defined in any of paragraphs 1-7, wherein the partitioned tomographic representation is used to plan, perform, or analyze a wellbore operation.

9. A non-transitory computer readable medium comprising instructions which, when executed by at least one processor, causes the processor to perform a method comprising: obtaining digital tomographic representation of a rock comprising pores and throats, wherein the pores are empty spaces inside the rock and the throats are connections between the pores; partitioning the pores and throats within the tomographic representation by: characterizing the pores using a Maximum Inscribed Ball technique; after the characterization, growing sizes of the pores and applying a Connected Component Labelling technique; and after growing the pores, separating the pores and throats using a Digital Binary Morphology technique, thereby generating the partitioned tomographic representation; and outputting the partitioned tomographic representation.

10. The computer readable medium as defined in paragraph 9, wherein characterizing the pores using the Maximum Inscribed Ball technique comprises: segmenting the representation into solid voxels and empty voxels, the empty voxels representing the pores; assigning each empty voxel a radius value for the ball inscribed in empty space surrounding the empty voxel; and iteratively computing a binary mask of the representation by assigning a 1 or 0 to each ball radius of the empty voxels, thereby characterizing the pores.

11. The computer readable medium as defined in paragraphs 9 or 10, wherein growing sizes of the pores and applying the Connected Component Labelling technique comprises: growing the pores by identifying regions of connected empty voxels using the binary mask, the regions being voxels of the same pore; and assigning a different label to each region using Connected Component Labelling.

12. The computer readable medium as defined in any of paragraphs 9-11, wherein separating the pores and throats using the Digital Binary Morphology technique comprises: iteratively performing a one-neighbor voxel dilation that grows each pore by any remaining, single, unlabeled empty voxel which neighbors the pore; and assigning a pore label or throat label to each neighboring voxel, thereby separating the pores and throats.

13. The computer readable medium as defined in any of paragraphs 9-12, wherein the partitioned tomographic representation is used to perform rock property characterization.

14. The computer readable medium as defined in any of paragraphs 9-13, wherein a fluid simulation is performed using the partitioned tomographic representation.

15. The computers readable medium as defined in any of paragraphs 9-14, wherein a downhole well is drilled or produced using the partitioned tomographic representation.

16. A system comprising processing circuitry to perform a method comprising: obtaining digital tomographic representation of a rock comprising pores and throats, wherein the pores are empty spaces inside the rock and the throats are connections between the pores; partitioning the pores and throats within the tomographic representation by: characterizing the pores using a Maximum Inscribed Ball technique; after the characterization, growing sizes of the pores and applying a Connected Component Labelling technique; and after growing the pores, separating the pores and throats using a Digital Binary Morphology technique, thereby generating the partitioned tomographic representation; and outputting the partitioned tomographic representation.

17. The system as defined in paragraph 16, wherein characterizing the pores using the Maximum Inscribed Ball technique comprises: segmenting the representation into solid voxels and empty voxels, the empty voxels representing the pores; assigning each empty voxel a radius value for the ball inscribed in empty space surrounding the empty voxel; and iteratively computing a binary mask of the representation by assigning a 1 or 0 to each ball radius of the empty voxels, thereby characterizing the pores.

18. The system as defined in paragraphs 16 or 17, wherein growing sizes of the pores and applying the Connected Component Labelling technique comprises: growing the pores by identifying regions of connected empty voxels using the binary mask, the regions being voxels of the same pore; and assigning a different label to each region using Connected Component Labelling.

19. The system as defined in any of paragraphs 16-18, wherein separating the pores and throats using the Digital Binary Morphology technique comprises: iteratively performing a one-neighbor voxel dilation that grows each pore by any remaining, single, unlabeled empty voxel which neighbors the pore; and assigning a pore label or throat label to each neighboring voxel, thereby separating the pores and throats.

20. The system as defined in any of paragraphs 16-19, wherein the partitioned tomographic representation is used to plan, perform, or analyze a wellbore operation.

Furthermore, any of the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to generate a partitioned digital tomographic representation, the method comprising:
obtaining a digital tomographic representation of a rock comprising pores and throats, wherein the pores are empty spaces inside the rock and the throats are connections between the pores;
partitioning the pores and throats within the tomographic representation by:
characterizing the pores using a Maximum Inscribed Ball technique;
after the characterization, growing sizes of the pores and applying a Connected Component Labelling technique, wherein growing sizes of the pores and applying the Connected Component Labelling technique comprises iteratively applying dilation to empty voxels representing the pores, and assigning a different label to each region using the Connected Component Labelling if the empty voxel is neighbor to another voxel of a previous iteration of the dilation, wherein a neighborhood is defined by at least one input parameter comprising connectivity; and
after growing the pores, separating the pores and throats using a Digital Binary Morphology technique, thereby generating the partitioned tomographic representation; and outputting the partitioned tomographic representation.

2. The computer-implemented method as defined in claim 1, wherein characterizing the pores using the Maximum Inscribed Ball technique comprises:

segmenting the tomographic representation into solid voxels and empty voxels, the empty voxels representing the pores;

assigning each empty voxel a radius value for the ball inscribed in empty space surrounding the empty voxel;

iteratively computing a binary mask of the representation by assigning a 1 or 0 to each ball radius of the empty voxels, thereby characterizing the pores.

3. The computer-implemented method as defined in claim 2, wherein growing sizes of the pores and applying the Connected Component Labelling technique comprises:

growing the pores by identifying regions of connected empty voxels using the binary mask, the regions being voxels of the same pore; and assigning a different label to each region using Connected Component Labelling.

4. The computer-implemented method as defined in claim 3, wherein separating the pores and throats using the Digital Binary Morphology technique comprises:

iteratively performing a one-neighbor voxel dilation that grows each pore by any remaining, single, unlabeled empty voxel which neighbors the pore; and assigning a pore label or throat label to each neighboring voxel, thereby separating the pores and throats.

5. The computer-implemented method as defined in claim 1, wherein the partitioned tomographic representation is used to perform rock property characterization.

6. The computer-implemented method as defined in claim 1, wherein a fluid simulation is performed using the partitioned tomographic representation.

7. The computer-implemented method as defined in claim 1, wherein a downhole well is drilled or produced using the partitioned tomographic representation.

8. The computer-implemented method as defined in claim 1, wherein the partitioned tomographic representation is used to plan, perform, or analyze a wellbore operation.

9. A non-transitory computer readable medium comprising instructions which, when executed by at least one processor, causes the processor to perform a method comprising:

obtaining digital tomographic representation of a rock comprising pores and throats, wherein the pores are empty spaces inside the rock and the throats are connections between the pores;

partitioning the pores and throats within the tomographic representation by:

characterizing the pores using a Maximum Inscribed Ball technique;

after the characterization, growing sizes of the pores and applying a Connected Component Labelling technique, wherein growing sizes of the pores and applying the Connected Component Labelling technique comprises iteratively applying dilation to the empty voxels, and assigning a different label to each region using the Connected Component Labelling if the empty voxel is neighbor to another voxel of a previous iteration of the dilation, wherein a neighborhood is defined by at least one input parameter comprising connectivity; and after growing the pores, separating the pores and throats using a Digital Binary Morphology technique, thereby generating the partitioned tomographic representation; and outputting the partitioned tomographic representation.

10. The computer readable medium as defined in claim 9, wherein characterizing the pores using the Maximum Inscribed Ball technique comprises:

segmenting the representation into solid voxels and empty voxels, the empty voxels representing the pores;

assigning each empty voxel a radius value for the ball inscribed in empty space surrounding the empty voxel; and iteratively computing a binary mask of the representation by assigning a 1 or 0 to each ball radius of the empty voxels, thereby characterizing the pores.

11. The computer readable medium as defined in claim 10, wherein growing sizes of the pores and applying the Connected Component Labelling technique comprises:

growing the pores by identifying regions of connected empty voxels using the binary mask, the regions being voxels of the same pore; and assigning a different label to each region using Connected Component Labelling.

12. The computer readable medium as defined in claim 11, wherein separating the pores and throats using the Digital Binary Morphology technique comprises:

iteratively performing a one-neighbor voxel dilation that grows each pore by any remaining, single, unlabeled empty voxel which neighbors the pore; and assigning a pore label or throat label to each neighboring voxel, thereby separating the pores and throats.

13. The computer readable medium as defined in claim 9, wherein the partitioned tomographic representation is used to perform rock property characterization.

14. The computer readable medium as defined in claim 9, wherein a fluid simulation is performed using the partitioned tomographic representation.

15. The computers readable medium as defined in claim 9, wherein a downhole well is drilled or produced using the partitioned tomographic representation.

16. A system comprising processing circuitry to perform a method comprising:

obtaining digital tomographic representation of a rock comprising pores and throats, wherein the pores are empty spaces inside the rock and the throats are connections between the pores;

partitioning the pores and throats within the tomographic representation by:

characterizing the pores using a Maximum Inscribed Ball technique;

after the characterization, growing sizes of the pores and applying a Connected Component Labelling technique, wherein growing sizes of the pores and applying the Connected Component Labelling technique comprises iteratively applying dilation to the empty voxels, and assigning a different label to each region using the Connected Component Labelling if the empty voxel is neighbor to another voxel of a previous iteration of the dilation, wherein a neighborhood is defined by at least one input parameter comprising connectivity; and after growing the pores, separating the pores and throats using a Digital Binary Morphology technique, thereby generating the partitioned tomographic representation; and outputting the partitioned tomographic representation.

17. The system as defined in claim 16, wherein characterizing the pores using the Maximum Inscribed Ball technique comprises:

segmenting the representation into solid voxels and empty voxels, the empty voxels representing the pores;

assigning each empty voxel a radius value for the ball inscribed in empty space surrounding the empty voxel; and iteratively computing a binary mask of the representation by assigning a 1 or 0 to each ball radius of the empty voxels, thereby characterizing the pores.

18. The system as defined in claim 17, wherein growing sizes of the pores and applying the Connected Component Labelling technique comprises:

growing the pores by identifying regions of connected empty voxels using the binary mask, the regions being voxels of the same pore; and assigning a different label to each region using Connected Component Labelling.

19. The system as defined in claim 18, wherein separating the pores and throats using the Digital Binary Morphology technique comprises:

iteratively performing a one-neighbor voxel dilation that grows each pore by any remaining, single, unlabeled empty voxel which neighbors the pore; and assigning a pore label or throat label to each neighboring voxel, thereby separating the pores and throats.

20. The system as defined in claim 16, wherein the partitioned tomographic representation is used to plan, perform, or analyze a wellbore operation.

* * * * *